UNITED STATES PATENT OFFICE 2,350,393

BASIC WATER-SOLUBLE DYESTUFFS

Bernd Eistert and Gerd Kochendoerfer, Ludwigshafen-on-the-Rhine, Germany, assignors, by mesne assignments, to General Aniline & Film Corporation, New York, N. Y., a corporation of Delaware No Drawing. Application November 7, 1940, Serial No. 364,676. In Germany November 27, 1939

8 Claims. (Cl. 260—240)

The present invention relates to new basic water-soluble dyestuffs of from violet to blue shade.

We have found that styryl dyestuff salts of the general formula

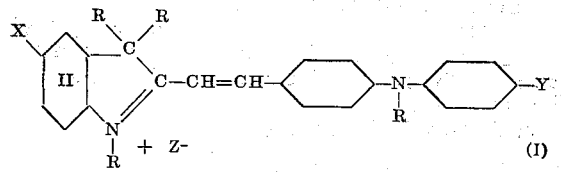

are very valuable basic water-soluble dyestuffs of from violet to blue shade. In that general formula the letters R stand for low-molecular alkyl groups, Y stands for hydrogen, a low-molecular alkyl or alkoxyl group, Z for the anion of an acid, X for a group containing at least one carbon atom directly attached to the nucleus marked II, which carbon atom is bound to oxygen or nitrogen by more than one linkage. The group X thus may be, for example, —COCH₃, —COC₆H₅, —CO—C₆H₄—CH₃, —CO—C₆H₄—OCH₃, —COOCH₃, —COOC₂H₅, —CON(C₂H₅)₂, —CO—NH—C₆H₄—OCH₃, —CN.

The dyestuffs are prepared by condensing in known manner in an acid medium either an aldehyde of the general formula A (see below) with a 1.3.3-trialkyl-2-methyleneindoline of formula B, or by condensing an aldehyde of the general formula C with a diphenylamine of the general formula D.

(A)

(B)
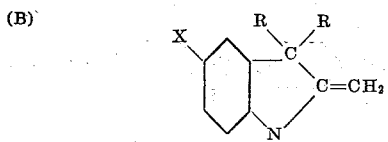

(C)
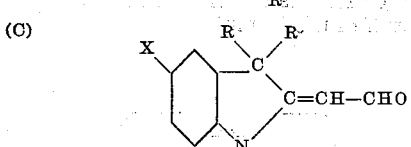

(D)
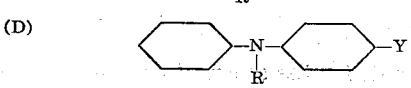

In these formulae the letters R, Y and X have the same meaning as above. The aldehydes and indol derivatives are prepared according to well known processes.

The indoline derivatives utilized for preparing the dyestuffs may be obtained by the same procedures heretofore utilized for producing unsubstituted indolines or the 5-methoxy indolines. For example, they may be prepared by applying to the corresponding phenyl hydrazines the procedures set forth in the article by G. Plancher which appears in Berichte, vol. 31, (1898) pages 1488 to 1499, and in particular pages 1491, 1496 and 1497. Thus, the indoline derivative with the X substituent in the 5-position may be prepared by starting with a phenyl hydrazine having the corresponding X substituent in the para- or 4-position. In the case of the example given below, one may start from the para- or 4-carboxy phenyl hydrazine.

Instead of the methylene compounds (B) their salts may be used, as for example the methosulphates, such as are formed by the addition of dialkyl sulphates to the corresponding 2.3.3-trialkylindolenines.

The new dyestuffs are soluble in water. They are especially useful in dyeing and printing acetate artificial silk, yielding from violet to blue dyeings of high brilliancy and intensity, and very fast to water as well as to washing and ironing and to light. The dyestuffs are also suitable for dyeing leather, paper, silk and tanned cotton.

The following example serves to illustrate how the present invention may be carried out in practice, but the invention is not restricted to this example. The parts are by weight.

Example 25.9 parts of 1-ethyl-2-methylene-3.3-dimethylindoline-5-carboxylic acid ethyl ester and 23.5 parts of 4'-ethoxy-N-methyl-diphenylamine-4-aldehyde are heated in 100 parts of glacial acetic acid for 5 to 6 hours at from 90 to 95° C. The solution is then poured into water, the dyestuff salted out with common salt and a solution of zinc chloride, separated from the acid layer, dissolved in the proper amount of hot water, whereupon the solution is filtered off from resinous contaminations and the dyestuff salted out by adding common salt. After filtration by suction and drying a dark bronzing crystal mass is obtained in a good yield which dissolves easily in water and the usual printing pastes. On acetate artificial silk it yields clear blue-violet dyeings and prints of good fastness to light and to water and washing.

The following table sets forth a series of other combinations as well as the shades obtainable therewith on acetate artificial silk. In these combinations R means —CH₃ and Y means —OC₂H₅:

X= —COOCH₃, bluish violet
X= —COCH₃, bluish violet
X= —COC₆H₅, violet blue
X= —CO—N(C₂H₅)₂, violet
X= —CN, reddish blue When using, instead of an aldehyde with Y like OC₂H₅, a corresponding aldehyde wherein Y is hydrogen or alkyl, dyestuffs of a somewhat redder shade are obtained; if one or both of the R's attached to the nitrogen atoms shown in the general Formula I be ethyl, somewhat bluer dyestuffs of otherwise the same constitution are obtained.

What we claim is:

1. Basic water-soluble dyestuffs corresponding to the general formula

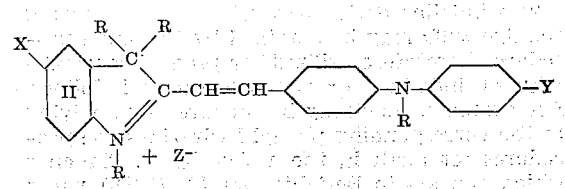

wherein the letters R stand for low-molecular alkyl groups, Y stands for a member of the group consisting of hydrogen, low-molecular alkyl and alkoxy groups, Z stands for the anion of an acid and X stands for a group selected from the class consisting of the keto, carboxylic acid ester and amide groups wherein the carbon atom of the carbonyl is directly attached to the benzene nucleus.

2. Basic water-soluble dyestuffs corresponding to the general formula

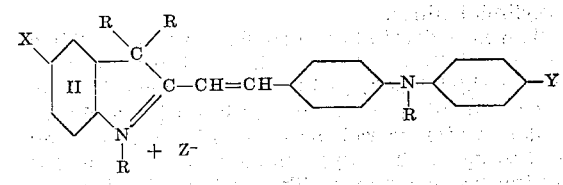

wherein the letters R stand for low-molecular alkyl groups, Y stands for a member of the group consisting of hydrogen, low-molecular alkyl and alkoxy groups, Z stands for the anion of an acid and X is a ketonic radical wherein the carbon atom of the keto group is attached directly to the nucleus marked II.

3. Basic water-soluble dyestuffs corresponding to the general formula

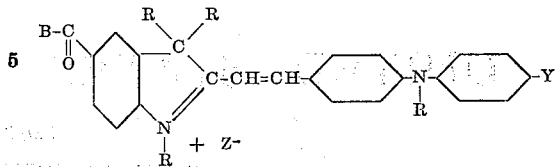

wherein the letters R stand for low-molecular alkyl groups, Y stands for a member of the group consisting of hydrogen, low-molecular alkyl and alkoxy groups, Z stands for the anion of an acid and B stands for a member of the group consisting of alkyl and aryl groups.

4. Basic water-soluble dyestuffs corresponding to the general formula

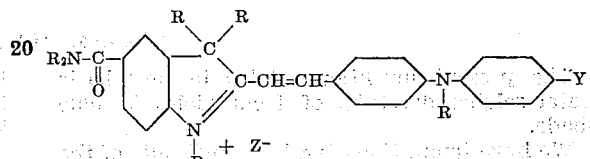

wherein the letters R stand for low-molecular alkyl groups, Y stands for a member of the group consisting of hydrogen, low-molecular alkyl and alkoxy groups, Z stands for the anion of an acid.

5. The dyestuff of the formula

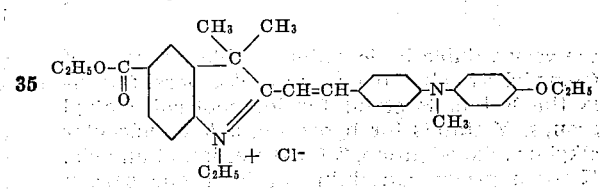

6. Basic water-soluble dyestuffs corresponding to the general formula

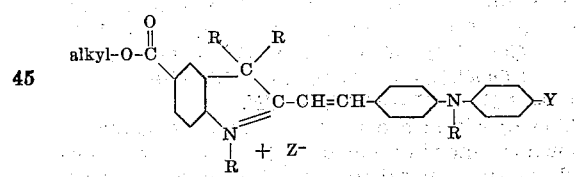

wherein the letters R stand for low-molecular alkyl groups, Y stands for a member of the group consisting of hydrogen, low-molecular alkyl and alkoxy groups, and Z stands for the anion of an acid.

7. The dyestuff of the formula

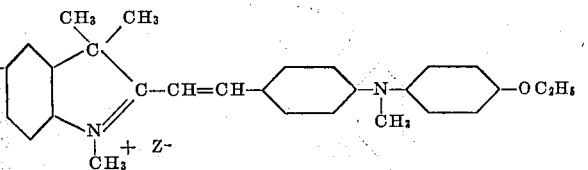

wherein Z stands for the anion of an acid.

8. The dyestuff of the formula

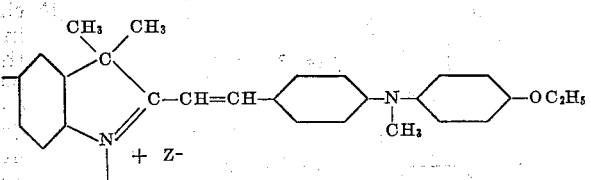

wherein Z stands for the anion of an acid.

BERND EISTERT.
GERD KOCHENDOERFER.